(12) United States Patent
Shimmo et al.

(10) Patent No.: US 7,777,958 B2
(45) Date of Patent: Aug. 17, 2010

(54) ERECTING EQUAL-MAGNIFICATION LENS ARRAY PLATE

(75) Inventors: Katsuhide Shimmo, Minato-ku (JP); Hideshi Nagata, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 102 days.

(21) Appl. No.: 12/258,910

(22) Filed: Oct. 27, 2008

(65) Prior Publication Data

US 2009/0141362 A1 Jun. 4, 2009

(30) Foreign Application Priority Data

Dec. 4, 2007 (JP) .............................. 2007-313742

(51) Int. Cl.
G02B 27/10 (2006.01)
(52) U.S. Cl. .................... 359/622; 359/621; 359/626
(58) Field of Classification Search .............. 359/621, 359/622, 626
See application file for complete search history.

(56) References Cited

U.S. PATENT DOCUMENTS

2009/0052044 A1 * 2/2009 Nagata ..................... 359/622

FOREIGN PATENT DOCUMENTS

JP 2005-037891 A 2/2005
JP 2005-122041 A 5/2005

* cited by examiner

Primary Examiner—David N Spector
(74) Attorney, Agent, or Firm—Sughrue Mion, PLLC (57) ABSTRACT

An erecting equal-magnification lens array plate includes a stack of a plurality lens array plates built such that pairs of corresponding lenses form a coaxial lens system, where each lens array plate is formed with a plurality of convex lenses on both surfaces of the plate. The plate receives light from a substantially straight light source facing one side of the plate, and the plate forms an erect equal-magnification image of the substantially straight light source on an image plane facing the other side of the plate. The main lens arrangement direction differs from the main scanning direction of the erecting equal-magnification lens array plate. The erecting equal-magnification lens array plate is provided with a first light shielding member operative to shield light not contributing to imaging and formed in the neighborhood of a position in the intermediate plane in the erecting equal-magnification lens array plate where an inverted image of the substantially straight light source is formed, and with a second light shielding member operative to reduce the amount of light incident on at least some of the lenses at the periphery in the sub-scanning direction and provided on a lens surface facing a light source.

4 Claims, 9 Drawing Sheets

ERECTING EQUAL-MAGNIFICATION LENS ARRAY PLATE

BACKGROUND OF THE INVENTION

1. Field of the Invention

The present invention relates to an erecting equal-magnification lens array plate used in image reading devices and image forming devices.

2. Description of the Related Art

Some image reading devices such as scanners and image forming devices such as LED printers are known to use erecting equal-magnification optical systems. Erecting equal-magnification optical systems are capable of reducing the size of devices better than reduction optical systems. In the case of image reading devices, an erecting equal-magnification optical system comprises a line light source, an erecting equal-magnification lens array, and a line image sensor. In the case of image forming devices, an erecting equal-magnification optical system comprises a line light source, an erecting equal-magnification lens array, and a photosensitive drum.

A rod lens array capable of forming an erect equal-magnification image is used as an erecting equal-magnification lens array in an erecting equal-magnification optical system. Normally, a rod lens array comprises an array of rod lenses in the longitudinal direction (main scanning direction of the image reading device) of the lens array. By increasing the number of columns of rod lenses, the proportion of light transmitted is improved and unevenness in the amount of light transmitted is reduced. Due to price concerns, it is common to use one or two columns of rod lenses in a rod lens array.

Meanwhile, an erecting equal-magnification lens array plate could be formed as a stack of a plurality of transparent lens array plates built such that the optical axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of columns can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating a ghost image as it leaves the plate.

Patent document No. 1 discloses a technology to address stray light whereby a light shielding wall is provided on the surface of an erecting equal-magnification lens array plate and a partition having a slit opening is provided around the erecting equal-magnification lens array plate. Patent document No. 2 discloses an imaging optical system provided with a light shielding means on an intermediate imaging surface of an erecting equal-magnification lens array plate.

[patent document No. 1] JP 2005-37891

[patent document No. 2] JP 2005-122041

We have made a study on an erecting equal-magnification lens array plate in which is not used a partition having a slit opening as disclosed in patent document No. 1, with the aim of reducing the size and weight of an optical system. A light shielding member operative to shield stray light is formed in the neighborhood of a position in the intermediate plane in the erecting equal-magnification lens array plate where an inverted image of a light source is formed. The main lens arrangement direction differs from the longitudinal direction of the erecting equal-magnification lens array plate.

We have found, however, that the amount of light is distributed quite unevenly in the main scanning direction if the erecting equal-magnification lens array plate as described above is used unmodified.

SUMMARY OF THE INVENTION

In this background, a general purpose of the present invention is to provide an erecting equal-magnification lens array plate capable of eliminating stray light suitably and reducing the unevenness in the distribution of the amount of light in the main scanning direction.

An erecting equal-magnification lens array plate according to at least one aspect of the present invention includes a stack of a plurality lens array plates built such that pairs of corresponding lenses form a coaxial lens system, where each lens array plate is formed with a plurality of lenses on one or both surfaces of the plate, the plate receiving light from a substantially straight light source facing one side of the plate, and the plate forming an erect equal-magnification image of the substantially straight light source on an image plane facing the other side of the plate, wherein the main lens arrangement direction differs from the longitudinal direction of the erecting equal-magnification lens array plate, the erecting equal-magnification lens array plate comprising: a first light shielding member operative to shield light not contributing to imaging and formed in the neighborhood of a position in the intermediate plane in the erecting equal-magnification lens array plate where an inverted image of the substantially straight light source is formed, and a second light shielding member operative to reduce the amount of light incident on at least some of the lenses at the periphery in the sub-scanning direction and provided on a lens surface of the erecting equal-magnification lens array plate facing a light source or a lens surface facing an image plane.

According to this aspect, by providing the first light shielding member in the neighborhood of a position in the intermediate plane in the erecting equal-magnification lens array plate where an inverted image of the substantially straight light source is formed, and by ensuring that the main lens arrangement direction is different from the longitudinal direction, stray light is suitably removed and a ghost-free erect equal-magnification image is formed on the imaging plane.

By providing the second shielding member for reducing the amount of light incident on at least some of the lenses at the periphery in the sub-scanning direction on the lens surface in the erecting equal-magnification lens array plate facing the light source or the lens surface facing the image plane, the unevenness in the distribution of the amount of light in the main scanning direction can be reduced. The erecting equal-magnification lens array plate according to this aspect has the stray light elimination capability and unevenness in the distribution of the amount of light commensurate with that of an erecting equal-magnification lens array plate using a partition with a slit opening. Therefore, reduction in the size and weight of the imaging optical system is promoted.

Particularly, by providing the second shielding member on the lens surface facing the light source, the light transmitted by the lenses at the periphery of the lens surface facing the light source and likely to be turned into stray light can be shielded.

The second shielding member may totally prevent light from being transmitted by areas, on the lens surface facing the light source or the lens surface facing the image plane, in which a distance from the central line in the sub-scanning direction is equal to or greater than a predetermined distance. Preferably, the second light shielding member is formed so as to cover at least a portion of the lens surface of at least one of the lenses at the periphery in the sub-scanning direction. The second shielding member is suitably formed in this way. The optimum predetermined distance may be determined by performing experiments or simulations so that the unevenness in the amount of light in the main scanning direction is minimized.

The second shielding member may be formed by printing a light shielding pattern on the lens surface facing the light source or the lens surface facing the image plane with a shielding material. Since the second shielding member is formed easily in this way, the manufacturing cost is reduced.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
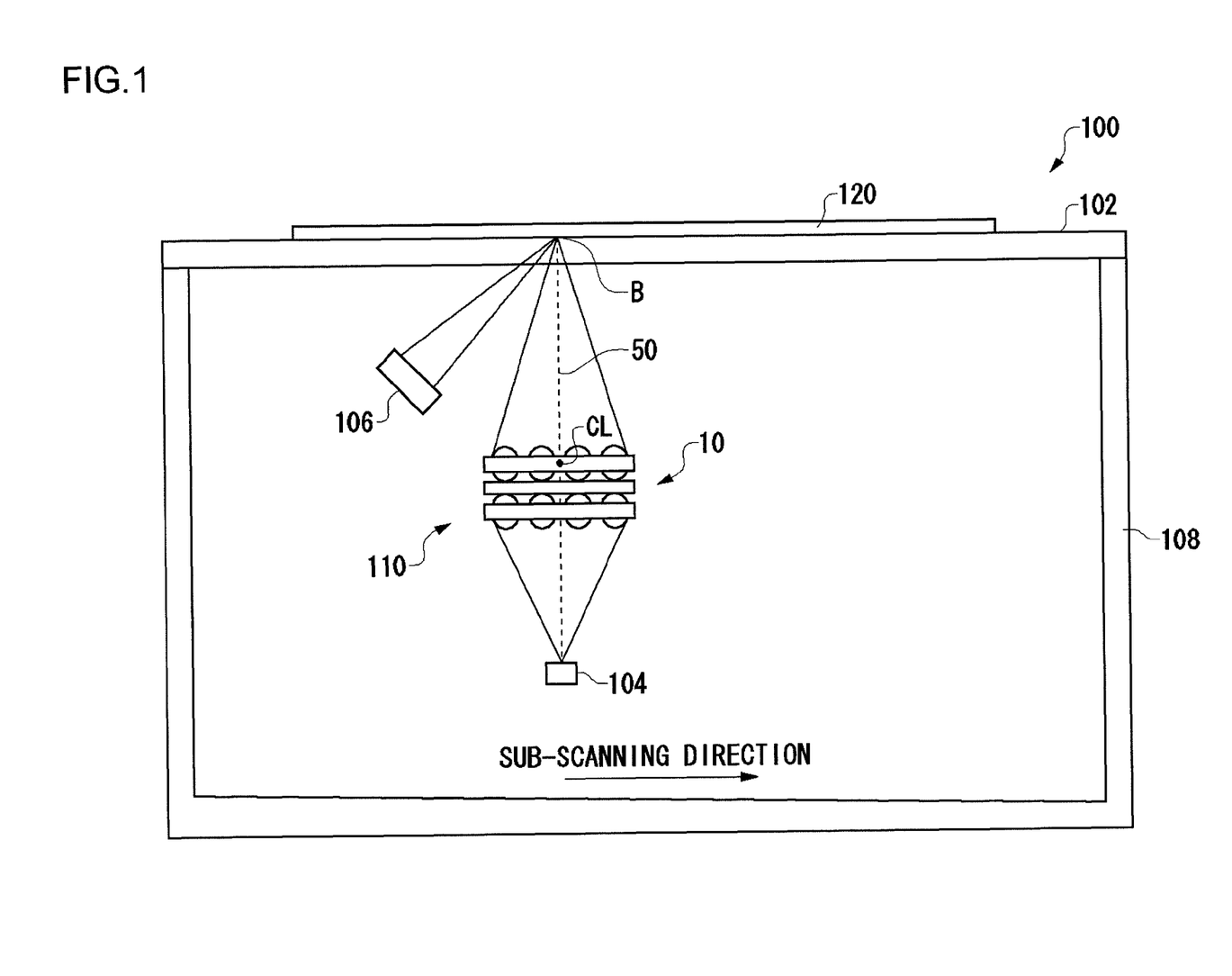
FIG. 1 shows the schematic structure of an image reading device using an erecting equal-magnification lens array plate according to an embodiment of the present invention.

FIG. 1 shows the schematic structure of an image reading device 100 using an erecting equal-magnification lens array plate 10 according to an embodiment of the present invention. An erecting equal-magnification imaging optical system 110 is housed inside a housing 108 of the image reading device 100. The erecting equal-magnification imaging optical system 110 is provided with a line light source 106, an erecting equal-magnification lens array plate 10, and a line image sensor 104.

The line light source 106 is a light source emitting a substantially straight light. The term "substantially straight" encompasses straight lines having a width of about 200 μm, or curves or staggered lines not exceeding a width of about 200 μm. The light exiting the line light source 106 irradiates a document 120 placed on a document table 102. The document 120 reflects the substantially straight light from the line light source 106 toward the erecting equal-magnification lens array plate 10. The light-reflecting region of the document 120 will be referred to as a light source B as the case demands. The light source B emits substantially straight light toward the erecting equal-magnification lens array plate 10.

The erecting equal-magnification lens array plate 10 comprises a stack of a plurality of transparent lens array plates built such that pairs of corresponding lenses form a coaxial lens system, where each lens array plate is formed with a plurality of lenses on one or both surfaces of the plate. The erecting equal-magnification lens array plate 10 receives substantially straight light from the light source B facing one side of the plate and forms an erect equal-magnification image on an image plane facing the other side of the plate. The line image sensor 104 is provided on an image plane on which the erect equal-magnification image is formed, so as to receive the erect equal-magnification image. By running the erecting equal-magnification imaging optical system 110 in the sub-scanning direction, the document 120 is scanned.

The erecting equal-magnification lens array plate 10 is installed in the image reading device 100 such that the longitudinal direction thereof is aligned with the main scanning direction and the lateral direction thereof is aligned with the sub-scanning direction. The erecting equal-magnification lens array plate 10 is installed the image reading device 100 such that the central line of the light source B and that of the line image sensor 104 are located on a reference plane 50, wherein the reference plane 50 is defined as a plane perpendicular to the erecting equal-magnification lens array plate 10 and passing through the central line CL of the erecting equal-magnification lens array plate 10 in the sub-scanning direction.

Figure 2:
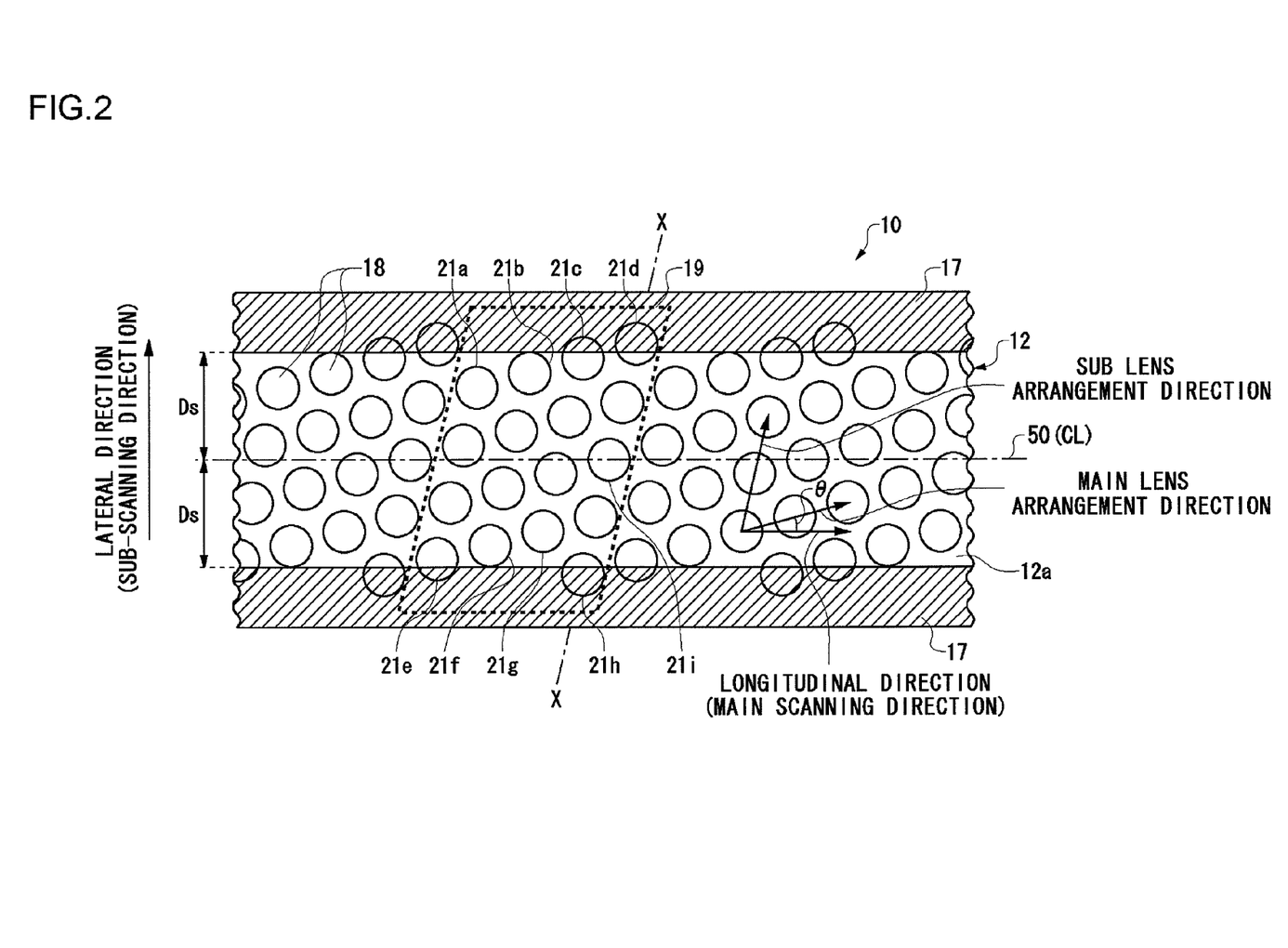
FIG. 2 is a top view of the erecting equal-magnification lens array plate according to the embodiment.
Figure 3:
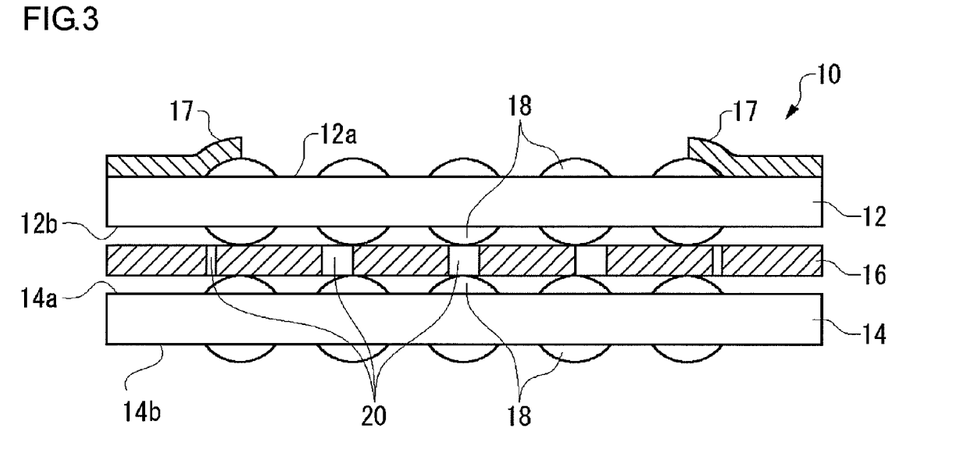
FIG. 3 shows an X-X section of the erecting equal-magnification lens array plate shown in FIG. 2.

FIG. 2 is a top view of the erecting equal-magnification lens array plate 10 according to the embodiment. FIG. 2 shows the erecting equal-magnification lens array plate 10 viewed from the light source B. FIG. 3 shows an X-X section of the erecting equal-magnification lens array plate 10 shown in FIG. 2.

As shown in FIGS. 2 and 3, the erecting equal-magnification lens array plate 10 is provided with a first lens array plate 12, a second lens array plate 14, a first light shielding member 16, and a second light shielding member 17. Each of the first lens array plate 12 and the second lens array plate 14 is rectangular in shape and is provided with an arrangement of a plurality of convex lenses 18 on both sides thereof.

Preferably, each of the first lens array plate 12 and the second lens array plate 14 is formed of a material amenable to injection molding, having high light transmittance in a desired wavelength range, and having low water absorption. Desired materials include cycloolefin resins, olefin resins, norbornene resins, and polycarbonate.

The convex lenses 18 are in the same arrangement pattern in the first lens array plate 12 and in the second lens array plate 14 such that the lenses face each other when the first lens array plate 12 and the second lens array plate 14 are placed opposite to each other. The first lens array plate 12 and the second lens array plate 14 are placed such that the optical axes of corresponding convex lenses 18 are aligned. In this embodiment, it is assumed that the convex lenses 18 are spherical in shape. Alternatively, the convex lenses 18 may have aspherical shapes.

As shown in FIG. 2, the convex lenses 18 are arranged in a hexagonal arrangement. A hexagonal arrangement extends in six directions as viewed from a given convex lens 18. Moreover, the convex lenses 18 are arranged in the erecting equal-magnification lens array plate 10 according to this embodiment such that the main direction of the arrangement of lenses is different from the longitudinal direction (main scanning direction) of the erecting equal-magnification lens array plate 10. In this embodiment, the direction of a line connecting the centers of two adjacent lenses will be referred to as a proximal lens arrangement direction. The phrase "adjacent lenses" denotes two lenses with no other lenses interposed therebetween. Of the proximal lens arrangement directions, the direction in which the maximum number of lenses occur in an arrangement will be referred to as a main lens arrangement direction. Of the angles formed by the main lens arrangement direction and the main scanning direction, the smaller will be referred to as a lens arrangement angle θ. Of the proximal lens arrangement directions, the direction in which the minimum number of lenses occur in an arrangement will be referred to as a sub lens arrangement direction.

In the case of forming an image of a point light source on an image plane using an erecting equal-magnification lens array plate in which lens array plates are placed opposite to each other, stray light occurs in the proximal lens arrangement direction. Therefore, if the main lens arrangement direction matches the main scanning direction, as disclosed in JP 2005-122041, stray light will directly enter the line image sensor provided parallel with the main scanning direction, generating a ghost image. The phenomenon occurs irrespective of whether a lens is located on the reference plane or away from the reference plane. A ghost image is generated so long as the lenses (light transmitting portions thereof) are arranged parallel to the main scanning direction. The erecting equal-magnification lens array plate 10 according to this embodiment can reduce stray light directly entering the line image sensor because the direction in which stray light occurs is shifted in the sub-scanning direction as a result of ensuring that the main lens arrangement direction is different from the main scanning direction.

The first light shielding member 16 is a film member provided between the first lens array plate 12 and the second lens array plate 14. As shown in FIG. 3, the first light shielding member 16 is sandwiched by the convex lens 18 formed on the bottom surface 12b of the first lens array plate 12 and the convex lens 18 formed on the top surface 14a of the second lens array plate 14.

The erecting equal-magnification lens array plate 10 is installed in the image reading device 100 shown in FIG. 1 such that the top surface 12a of the first lens array plate 12 faces the light source B and the bottom surface 14b of the second lens array plate 14 faces the line image sensor 104 (image formation plane). The top surface 12a of the first lens array plate 12 will be referred to as a light source lens surface 12a and the bottom surface 14b of the second lens array plate 14 will be referred to as an image formation plane lens surface 14b.

The first light shielding member 16 functions as a light shielding means for shielding light not contributing to imaging. As described, the erecting equal-magnification lens array plate 10 is configured such that the main lens arrangement direction differs from the main scanning direction. This can only ensure that the direction in which stray light occurs is shifted in the sub-scanning direction and does not eliminate stray light itself. In this regard, the erecting equal-magnification lens array plate 10 according to this embodiment is provided with the first light shielding member 16 so as to prevent stray light shifted in the sub-scanning direction from being transmitted by the erecting equal-magnification lens array plate 10. Even if stray light does not directly enter the line image sensor, illumination of the neighborhood of the line image sensor by stray light results in lower contrast and drop in image quality. By providing the first light shielding member 16, stray light is suitably eliminated and image quality is improved.

Figure 4:
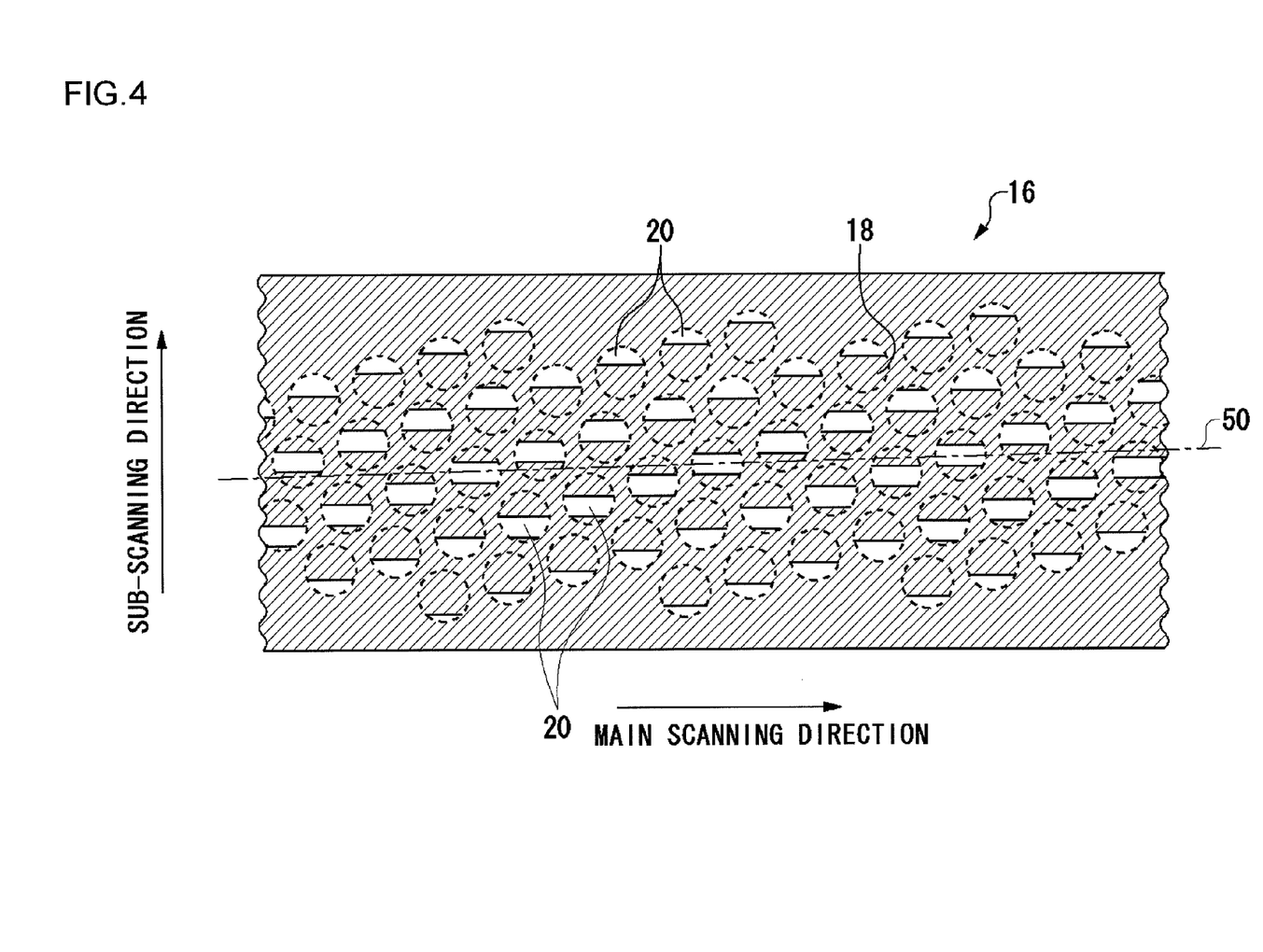
FIG. 4 is a top view of the first light shielding member.

FIG. 4 is a top view of the first light shielding member 16. FIG. 4 shows the convex lenses 18 by broken lines to help understand the relative positions of the convex lenses 18 and slit openings 20. The first light shielding member 16 ensures that each of the convex lenses 18 transmits light in a region in which the effective region of the convex lens 18 overlaps the slit opening 20 having a regular width substantially parallel with the main scanning direction and that light is totally prevented from being transmitted in the other regions. The term "effective region of a lens" refers to a portion having the function of a lens. The term "substantially parallel" means close to parallel and encompasses lines intersecting at an angle of, for example, 10° or less, and wavy lines the longitudinal axes of which are parallel.

As shown in FIG. 4, the first light shielding member 16 is configured such that one slit opening 20 is formed for each convex lens 18. The slit opening 20 restricts the light transmitting region of each convex lens 18. The regions of the first light shielding member 16 other than the slit openings 20 are covered by a light absorbing layer, totally shielding light.

The first light shielding member 16 may be implemented by printing a light absorbing layer on the surface of a film having high light transmittance and forming the slit openings 20 accordingly, or by providing holes in a film having low light transmittance and forming the slit openings 20 accordingly.

The slit opening 20 of the first light shielding member 16 is formed in the neighborhood of a position in the intermediate plane occurring in the direction of stack in the erecting equal-magnification lens array plate 10 where an inverted image of the light source B is formed. Since the position where an inverted image of the light source B is formed differs from lens to lens, the position of the slit opening 20 differs from lens to lens. For example, in the case of the convex lens 18 the center of which is located on the reference plane 50, the center of the slit opening 20 is aligned with the lens center. The farther the lens center from the reference plane 50, the farther the center of the slit opening 20 from the lens center. The shape and position of the slit opening 20 will be described in detail later. By providing the first light shielding member 16 formed with the slit openings 20 as shown in FIG. 4 between the first lens array plate 12 and the second lens array plate 14, it is possible to eliminate light not contributing to imaging, while transmitting light contributing to imaging onto the image plane.

Figure 5:
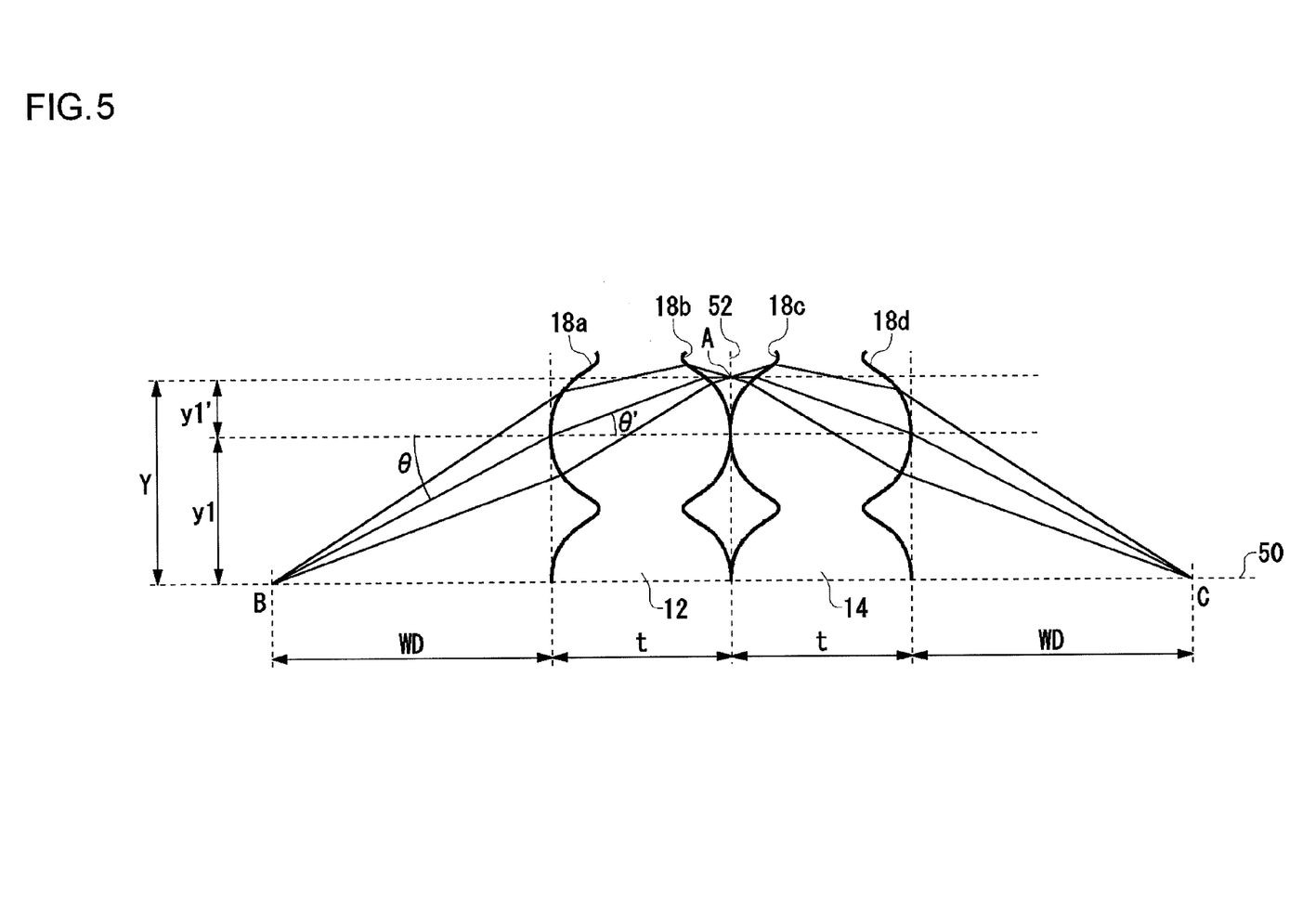
FIG. 5 illustrates a position where a slit opening is formed.

FIG. 5 illustrates a position where the slit opening 20 is formed. FIG. 5 shows the first lens array plate 12 and the second lens array plate 14 arranged such that the corresponding lenses are in contact. Referring to FIG. 5, the vertical direction in the illustration represents the sub-scanning direction (lateral direction) of the erecting equal-magnification lens array plate 10 and the depth direction in the illustration represents the main scanning direction (longitudinal direction).

Referring to FIG. 5, the light emitted by the light source B is condensed by the convex lenses 18a and 18b of the first lens array plate 12 so that an inverted image A is formed on an intermediate plane between the first lens array plate 12 and the second lens array plate 14. The intermediate plane on which the inverted image is formed will be referred to as an inverted image formation plane 52. The inverted image A is condensed by the convex lenses 18c and 18d of the second lens array plate 14 so that an erect equal-magnification image C is formed on the image plane.

Figure 6:
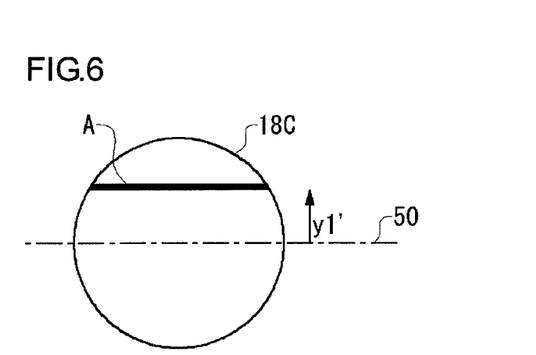
FIG. 6 shows an inverted image A on an inverted image formation plane.

FIG. 6 shows an inverted image A on the inverted image formation plane 52. Since the erecting equal-magnification lens array plate 10 is applied to an optical system using a line light source, the inverted image A will become a substantially straight line, as shown in FIG. 6. The aperture of the convex lens is spherical. However, only the region of the lens forming the inverted image A is used for imaging. Therefore, the slit opening 20 may be formed around the region.

Referring back to FIG. 5, given that the lens array plate has a plate thickness t and a refractive index n, the lens's working distance is denoted by WD, and assuming that the light from the light source B on the reference plane 50 located at a distance y1 from the lens center is condensed so as to form the inverted image A at a distance y1' from the lens center, a distance y1' from the lens center to the inverted image A is obtained as follows.

Given that the angle of incidence of light entering the convex lens 18a from the light source B is denoted by θ, and the refractive angle of light entering the convex lens 18a is denoted by θ', Snell's law requires that the relation of expression (1) holds between θ and θ'.

$$\sin\theta = n \times \sin\theta' \tag{1}$$

Referring to FIG. 5, the relations of expressions (2) and (3) hold.

$$\tan\theta = y1/WD \tag{2}$$

$$\tan\theta' = y1'/t \tag{3}$$

Approximating such that $\sin\theta \cong \tan\theta$ and $\sin\theta' \cong \tan\theta'$, expression (4) below is derived from expressions (1)-(3).

$$y1'/y1 = t/(WD \times n) \tag{4}$$

Since $t/(WD \times n)$ on the right side of expression (4) is a constant, the position at which the inverted image A is formed is displaced from the lens center by an amount proportional to distance y1 between the reference plane 50 and the lens center.

Since a distance Y between the reference plane 50 and the inverted image A is denoted by Y=y1+y1', the relation of expression (5) below holds.

$$Y/y1 = 1 + t/(WD \times n) \tag{5}$$

Since $1+t/(WD \times n)$ on the right side of expression (5) is a constant (hereinafter, the constant will be referred to as F as appropriate), the distance Y between the reference plane 50 and the inverted image A is the distance y1 between the reference plane 50 and the lens center multiplied by a predetermined factor F. The position at which the inverted image A is formed is calculated for each convex lens 18 according to expression (5). The slit opening 20 is formed such that the center of the width thereof in the sub-scanning direction lies at the calculated position. In this way, imaging light is properly transmitted, while stray light is eliminated.

In this embodiment, the slit opening 20 is formed such that the center thereof lies at the position where the inverted image A is formed. However, the opening may be formed in the neighborhood of a position where the inverted image A is formed instead of exactly where the inverted image A is formed. That is, it would be required to form the slit opening 20 so that the light contributing to the formation of the inverted image A is transmitted. For example, the slit opening 20 may be directly formed at the position on the surface of the lower convex lens 18 on the bottom surface 12b of the first lens array plate 12 where the light contributing to the formation of the inverted image A passes, or at the position of the surface of the upper convex lens 18 on the top surface 14a of the second lens array plate 14 where the light contributing to the formation of the inverted image A passes, using a printing method or a photoresist process.

A description will now be given of the width of the slit opening 20 in the sub-scanning direction. As mentioned earlier, the slit opening 20 is formed in the neighborhood of a position on the inverted image formation plane 52 where the inverted image is formed. It would be sufficient, for the purpose of transmitting imaging light, for the width of the opening to be equal to the width of the imaging light. It is preferable, however, to ensure that the width of the slit opening 20 in the sub-scanning direction be as large as possible to facilitate the step of aligning the first lens array plate 12, the second lens array plate 14, and the light shielding member 16. By facilitating the alignment step, the manufacturing cost is reduced.

Figure 7:
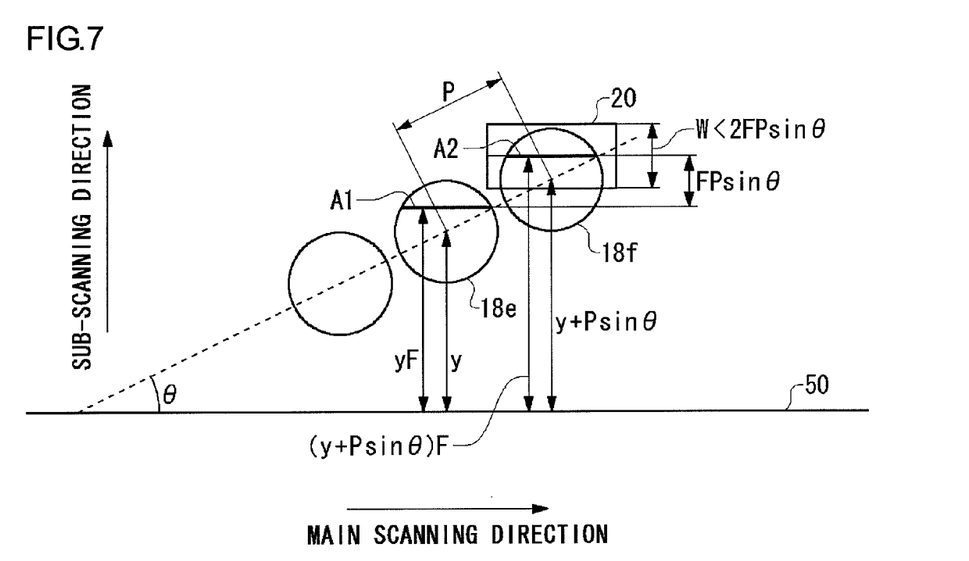
FIG. 7 illustrates the width w of the slit opening in the sub-scanning direction.

FIG. 7 illustrates the width w of the slit opening in the sub-scanning direction. As shown in FIG. 7, it will be assumed that the convex lenses 18e and 18f are arranged at a pitch P and a lens arrangement angle θ. The pitch P represents an interval between two lenses arranged in the main lens arrangement direction. Given that a distance between the center of the convex lens 18e and the reference plane 50 is denoted by y, a distance between the center of the convex lens 18f adjacent to the convex lens 18e and the reference plane 50 is given by $y+P \times \sin\theta$. A distance between an inverted image A1 formed by the convex lens 18e and the reference plane 50 is given by $y \times F$, and a distance between an inverted image A2 formed by the convex lens 18f and the reference plane 50 is given by $(y+P \times \sin\theta) \times F$. Accordingly, a distance between the inverted image A1 and the inverted image A2 in the sub-scanning direction is given by $F \times P \times \sin\theta$.

For the purpose of preventing stray light transmitted by the convex lens 18e and passing through the position in the sub-scanning direction where the inverted image A1 is formed by the convex lens 18e from being transmitted by the slit opening 20, it will be ensured that half a distance w/2 of the width w of the slit opening 20 associated with the convex lens 18f in the sub-scanning direction is smaller than the distance $F \times P \times \sin\theta$ between the inverted image A1 and the inverted image A2, assuming that the width of the inverted image A1 in the sub-scanning direction is negligibly small. In other words, it would be required for the width of the slit opening 20 in the sub-scanning direction to be in the range of expression (6) below.

$$w < 2 \times F \times P \times \sin\theta \tag{6}$$

Thus, the width w of the slit opening 20 in the sub-scanning direction need be smaller than $2 \times F \times P \times \sin\theta$ on the right side of expression (6) in order to shield stray light.

Figure 8:
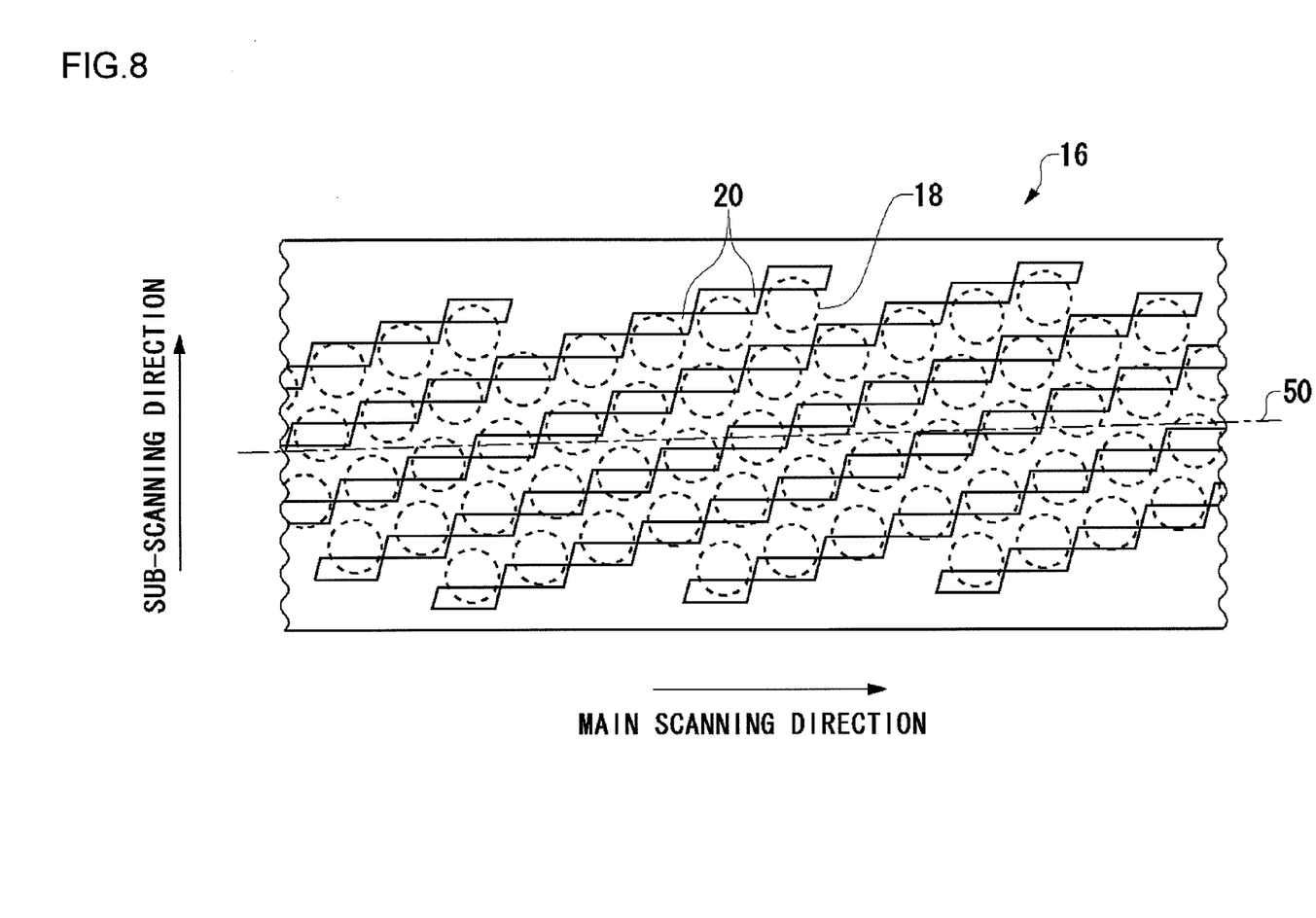
FIG. 8 shows the relative position of the slit openings and convex lenses.

Described above is the position where the slit opening 20 is formed and the width thereof in the sub-scanning direction. FIG. 8 shows the relative position of the slit openings 20 and the convex lenses 18. The member of FIG. 4 establishes a light transmitting region in each of the lenses 18 where the slit opening 20 of FIG. 8 and the effective region of the convex lens 18 overlap.

Referring back to FIGS. 2 and 3, a description will be given of the second light shielding member 17. In the erecting equal-magnification lens array plate 10 according to the embodiment, the second light shielding member 17 for reducing the amount of light incident on at least some of the lenses located at the periphery in the sub-scanning direction is provided on the light source lens surface 12*a* of the erecting equal-magnification lens array plate 10.

The light source lens surface 12*a* is defined as a lens surface located closest to the light source B as the erecting equal-magnification lens array plate 10 is installed in the image reading device 100. The term "the lenses located at the periphery in the sub-scanning direction" refers to lenses constituting the convex lenses 18 on the light source lens surface 12*a* and located at the ends of the lens arrangement in the sub-direction. As shown in FIG. 2, the erecting equal-magnification lens array plate 10 according to the embodiment includes a lens arrangement in which a plurality of blocks 19 are arranged in the main scanning direction, each block 19 being defined as four arrangements of lenses aligned in the sub lens arrangement direction. Of the lenses in the block, eight convex lenses 21*a*, 21*b*, 21*c*, 21*d*, 21*e*, 21*f*, 21*g*, and 21*h* are "lenses located at the periphery in the sub-scanning direction". The term "lenses located at the periphery in the sub-scanning direction" refers to convex lenses 18 at the ends so as to constitute the lenses aligned in the sub lens arrangement direction and function as lenses. The term "functions as lenses" means to "transmit or refract incident light". For example, referring to the arrangement of lenses in the sub lens arrangement direction to which the convex lens 21*d* and the convex lens 21*h* belong, if a convex lens completely covered by the second light shielding member 17 is formed outside the convex lens 21*d* or the convex lens 21*h* in the sub lens arrangement direction, light is not incident on the convex lens thus formed so that the convex lens does not function as a lens. Therefore, such a lens is not regarded as a lens located at the periphery in the sub-scanning direction.

The second light shielding member 17 totally prevents light from being transmitted by areas on the light source lens surface 12*a* in which the distance D from the central line CL in the sub-scanning direction is equal to or greater than a predetermined light-shielding distance Ds. The second light shielding member 17 is formed by printing a light shielding pattern on the light source lens surface 12*a*, the light shielding pattern totally preventing light from being transmitted by areas at the light-shielding distance Ds or farther, using a light-shielding material such as black ink. Thus, the second light shielding member 17 can be formed easily by printing so that the manufacturing cost is reduced.

As shown in FIG. 2, the four lenses 21*c*, 21*d*, 21*e*, and 21*h* located at the periphery in the sub-scanning direction have a part of their surfaces covered by the second light shielding member 17. As mentioned above, the convex lenses 18 in the erecting equal-magnification lens array plate 10 according to the embodiment are arranged such that the main lens arrangement direction differs from the main scanning direction. Therefore, by varying the light-shielding distance Ds, the amount of light incident on the lenses located at the periphery in the sub-scanning direction can be adjusted continuously.

Figure 9:
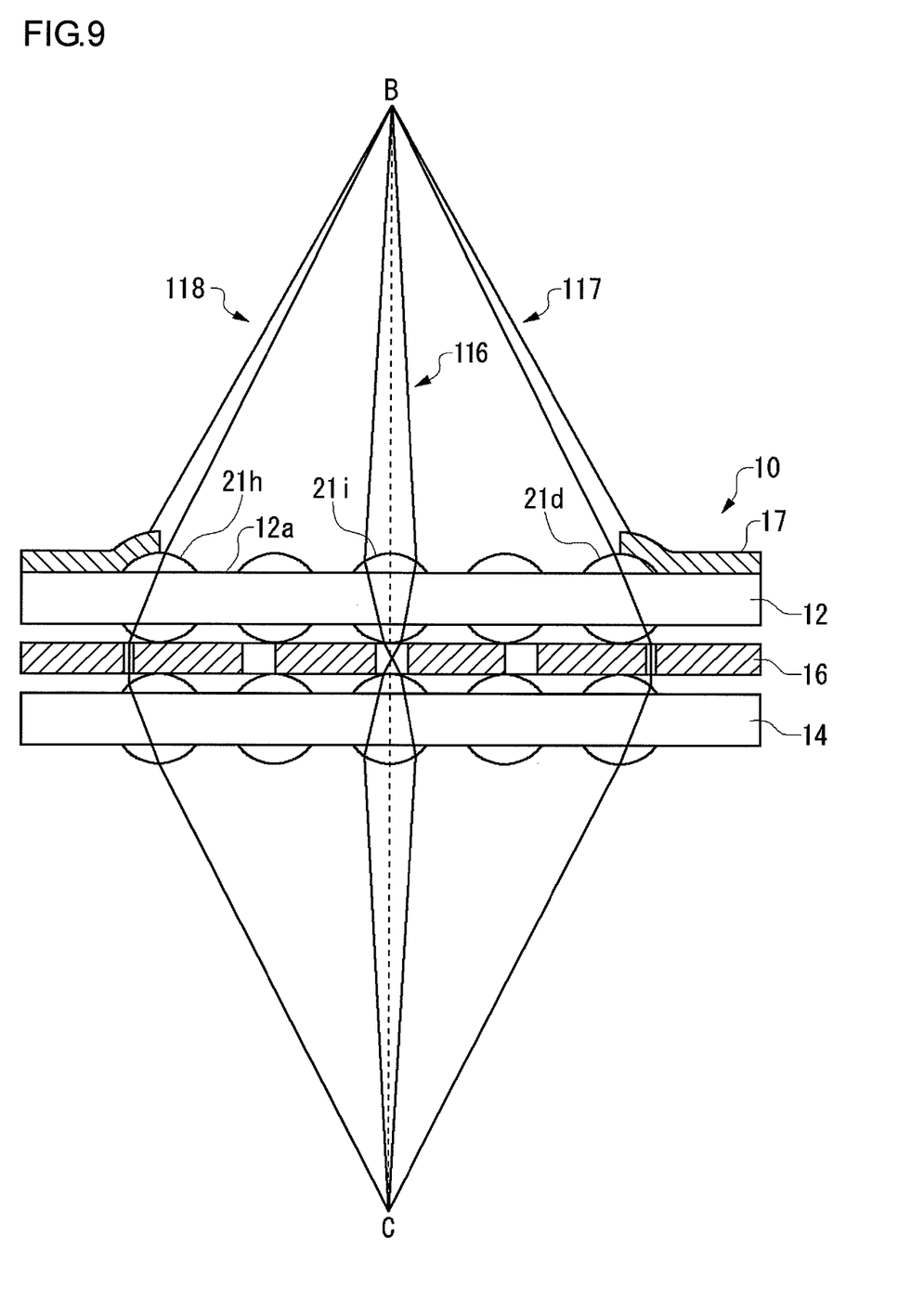
FIG. 9 shows how the erecting equal-magnification lens array plate according to the embodiment operates.

FIG. 9 shows how the erecting equal-magnification lens array plate 10 according to the embodiment operates. FIG. 9 shows how light exiting the light source B is condensed by the erecting equal-magnification lens array plate 10 so as to form an erect equal-magnification image C on the image plane. As an example of light traveling toward the convex lens not covered by the second light shielding member 17, FIG. 9 shows light 116 traveling toward the convex lens 21*i* located on the central line CL in the sub-scanning direction. As an example of light traveling toward lenses at the periphery in the sub-scanning direction partially covered by the second light shielding member 17, FIG. 9 shows light 117 and light 118 respectively traveling toward the lenses 21*d* and 21*h* at the periphery in the sub-scanning direction.

As shown in FIG. 9, the light 116 traveling toward the effective region of the convex lens 21*i* is incident on the convex lens 21*i* without being shielded by the second light shielding member 17 and condensed by the associated convex lens on the bottom surface of the first lens array plate 12 and the associated convex lenses of the second lens array plate 14, so as to form an image on the image plane.

A portion of the light 117 traveling toward the lens 21*d* at the periphery in the sub-scanning direction is incident on the convex lens 21*d* at the periphery in the sub-scanning direction so as to form an image on the image plane. Another portion of the light is, however, shielded by the second shielding member 17 and cannot enter the lens 21*d* at the periphery in the sub-scanning direction. Similarly, a portion of the light 118 traveling toward the lens 21*h* at the periphery in the sub-scanning direction is incident on the lens 21*h* at the periphery in the sub-scanning direction so as to form an image on the image plane. Another portion of the light is, however, shielded by the second shielding member 17 and cannot enter the lens 21*h* at the periphery in the sub-scanning direction. Thus, in the erecting equal-magnification lens array plate 10 according to the embodiment, the amount of light incident on the lenses at the periphery in the sub-scanning direction is reduced due to the second shielding member 17 covering a portion of the lenses.

In the erecting equal-magnification lens array plate in which the convex lenses 18 are arranged such that the main lens arrangement direction is different from the main scanning direction, the number of lenses involved in forming an image on the line image sensor varies depending on the location in the main scanning direction. This results in the unevenness in the amount of light in the main scanning direction. By providing the second shielding member 17 in the erecting equal-magnification lens array plate 10 according to the embodiment, the amount of light incident on the lenses at the periphery in the sub-scanning direction is reduced. Accordingly, the amount of light is reduced where there is a localized increase in the number of convex lenses involved in image formation. As a result, the unevenness in the amount of light is reduced in the erecting equal-magnification lens array plate 10 as a whole.

As described above, the amount of light incident on the lenses at the periphery in the sub-scanning direction can be adjusted continuously by varying the light-shielding distance Ds of the second shielding member 17. Therefore, the unevenness in the amount of light in the main scanning direction of the line image sensor can be controlled by adjusting the light-shielding distance Ds. The optimum light-shielding distance Ds may be determined by performing experiments or simulations so that the unevenness in the amount of light in the main scanning direction is minimized.

Figure 10:
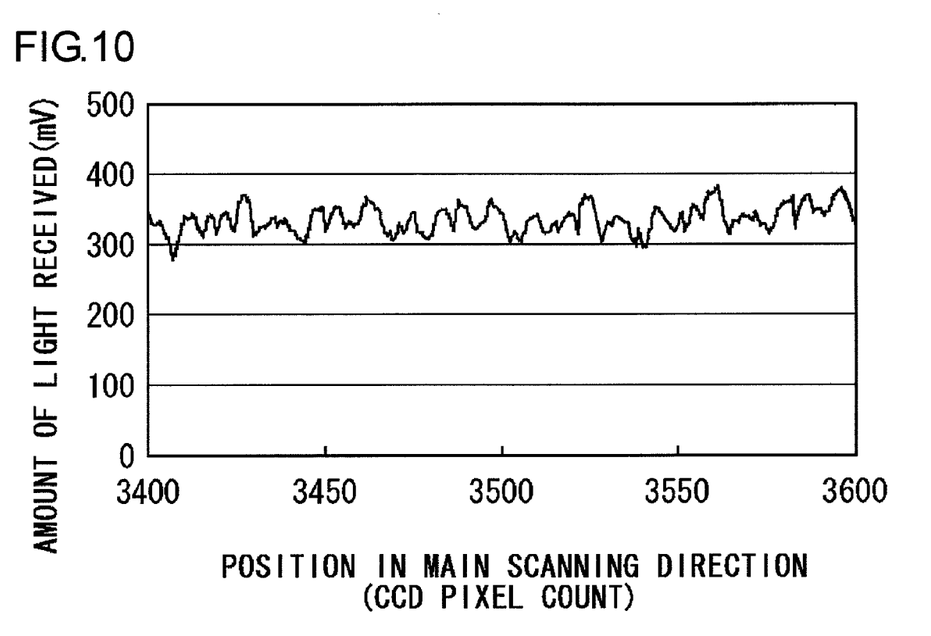
FIG. 10 shows the unevenness in the amount of light in the main scanning direction of the erecting equal-magnification lens array plate according to the embodiment.
Figure 11:
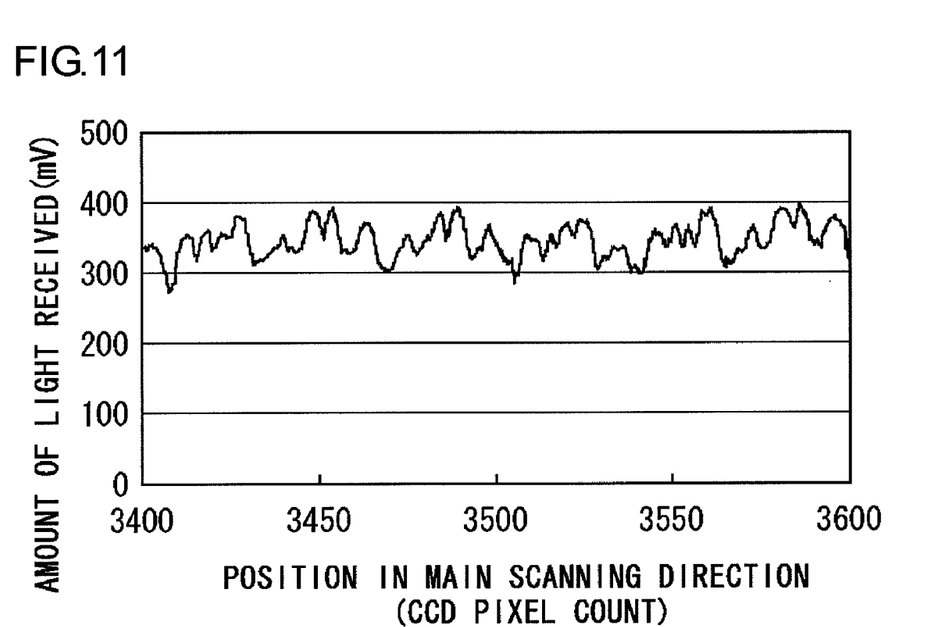
FIG. 11 shows the unevenness in the amount of light in the main scanning direction of the erecting equal-magnification lens array plate not provided with the second light shielding member.

FIG. 10 shows the unevenness in the amount of light in the main scanning direction of the erecting equal-magnification lens array plate according to the embodiment. FIG. 11 shows the unevenness in the amount of light in the main scanning direction of the erecting equal-magnification lens array plate not provided with the second light shielding member 17. Referring to FIGS. 10 and 11, the vertical axis represents the amount of light received by the line image sensor (CCD) and the horizontal axis represents the position in the main scanning direction of the erecting equal-magnification lens array plate.

A ray tracing simulation was conducted. The entirety of the erecting equal-magnification lens array plate 10 is illuminated in the main scanning direction in a Lambertian distribution by a substantially straight ray of light representing the light source B. The amount of light arriving at a specific line on the image plane is designated as the amount of light received by the line image sensor. The conditions of simulation are such that the lens arrangement is a hexagonal arrangement, the lens's working distance WD=6.7 mm, the plate thickness t of the lens array plate is such that t=2.4 mm, the lens pitch P=0.42 mm, the lens diameter D=0.336 mm, the refractive index n=1.53, the curvature radius=0.679 mm, the TC conjugation length=18.2 mm, and the light shielding distance Ds=0.7 mm. It was assumed that the w of the slit opening in the sub-scanning direction is 0.01 mm.

A comparison of FIG. 10 and FIG. 11 shows that the unevenness in the amount of light in the main scanning direction is improved in the erecting equal-magnification lens array plate 10 according to the embodiment provided with the second light shielding member 17. It will be given that the maximum value of the amount of light received is indicated by Pmax and the minimum value thereof is indicated by Pmin, and defining the ripple R by expression (7) below.

$$R=(P\text{max}-P\text{min})/(P\text{max}+P\text{min}) \quad (7)$$

In the case of the erecting equal-magnification lens array plate of FIG. 11 not provided with the second shielding member 17, the ripple R=26%. In the case of the erecting equal-magnification lens array plate of FIG. 10 according to the embodiment, the ripple is reduced such that R=18%.

Described above is the erecting equal magnification lens array plate according to the embodiment. The first light shielding member 16 with the slit opening 20 is formed in the intermediate plane between the first lens array plate and the second lens array plate of the erecting equal-magnification lens array plate. It is further ensures that the main arrangement direction of the convex lenses is different from the main scanning direction of the erecting equal-magnification lens array plate. In this way, imaging light is properly transmitted, while stray light is suitably eliminated.

By providing the second shielding member for reducing the amount of light incident on at least some of the lenses at the periphery in the sub-scanning direction on the lens surface in the erecting equal-magnification lens array plate facing the light source, the unevenness in the distribution of the amount of light in the main scanning direction can be reduced.

In the erecting equal-magnification lens array plate according to the embodiment, the second shielding member is formed on the lens surface facing the light source. The light transmitted by the lenses at the periphery of the lens surface facing the light source is likely to be turned into stray light due to lens aberration since the light passes through the end of the lens at the intermediate plane. The stray light once generated is difficult to be removed if the second shielding member is provided on the lens surface facing the image plane. By providing the second shielding member on the lens surface facing the light source according to the embodiment, the light transmitted by the lenses at the periphery of the lens surface facing the light source and likely to be turned into stray light can be shielded.

The erecting equal-magnification lens array plate according to the embodiment is capable of reducing the unevenness in the amount of light in the main scanning direction, while satisfactorily removing stray light, without using a partition having a slit opening as disclosed in cited document 1. Therefore, the size and weight of the optical system is reduced. Since the number of parts is reduced, the cost is reduced accordingly. Further, since a partition is not provided, the likelihood of light reflected by a partition turning into stray light is eliminated. Since a ghost image is prevented from being created when the plate is built in an image forming device, image quality is improved.

Since the first light shielding member is provided between the lens array plates and the second shielding member is formed by printing on the lens surface facing the light source, the adjustment of position of the partition and the lens array plate is not necessary and the manufacturing cost is reduced. Since the first light shielding member and the second shielding member are integral with the lens array plate, the positions of the members do not vary and so can prevent stray light in a stable manner once they are secured.

Since the erecting equal-magnification lens array plate according to the embodiment eliminates stray light but does not eliminate imaging light, the plate can form an optical system highly transmissive of imaging light and allows a bright image, and particularly an image that is bright in the sub-scanning direction, to be obtained.

The erecting equal-magnification lens array plate according to the embodiment has the stray light elimination capability and unevenness in the amount of light in the main scanning direction commensurate with that of the related-art erecting equal-magnification lens array plate using a partition with a slit opening. Accordingly, the erecting equal-magnification lens array plate according to this embodiment can be used in high-quality image reading devices and image writing devices.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, in the embodiment, the first light shielding member is formed by sandwiching a film member between the first lens array plate and the second lens array plate. Alternatively, the first light shielding member may be formed by printing a slit opening pattern on the bottom of the first lens array plate or the top of the second lens array plate using a light-shielding material such as black ink.

In this case, the slit opening is formed at a position on the surface of the convex lens on the bottom of the first lens array plate where light contributing to formation of an inverted image passes, and/or a position on the surface of the convex lens on the top of the second lens array plate where light contributing to formation of an inverted image passes. Since this eliminates the step of adjusting the position of a light shielder, the fabrication cost is reduced.

In the embodiment described, a stack of two lens array plates is built to form an erecting equal-magnification lens array plate. The number of plates stacked is not limited to two. For example, three lens array plates may be stacked, the first light shielding member may be provided on the intermediate plane in the lens array plate in the middle, and the second shielding member may be formed in on the lens surface closest to the light source.

In the embodiment described, lenses are arranged in a hexagonal arrangement. However, the lens arrangement pattern may not be limited to a hexagonal arrangement. For example, the lenses may be arranged in a square arrangement.

In the embodiment described, the second light shielding member is formed by printing a light shielding pattern on the lens surface facing the light source. Alternatively, the second shielding member may be formed by pasting a light shielding tape on the lens surface facing the light source or placing a light shielding plate formed of, for example, a metal on the lens surface facing the light source.

In the embodiment described, the second light shielding member is provided on the lens surface facing the light source. Alternatively, the second light shielding member may be provided on the lens surface facing the image plane. In this case, too, the unevenness in the distribution of the amount of light in the main scanning direction is reduced.

What is claimed is:

1. An erecting equal-magnification lens array plate including a stack of a plurality lens array plates built such that pairs of corresponding lenses form a coaxial lens system, where each lens array plate is formed with a plurality of lenses on one or both surfaces of the plate, the plate receiving light from a substantially straight light source facing one side of the plate, and the plate forming an erect equal-magnification image of the substantially straight light source on an image plane facing the other side of the plate, wherein the main lens arrangement direction differs from the longitudinal direction of the erecting equal-magnification lens array plate, the erecting equal-magnification lens array plate comprising:

a first light shielding member operative to shield light not contributing to imaging and formed in the neighborhood of a position in the intermediate plane in the erecting equal-magnification lens array plate where an inverted image of the substantially straight light source is formed, and a second light shielding member operative to reduce the amount of light incident on at least some of the lenses at the periphery in the sub-scanning direction and provided on a lens surface of the erecting equal-magnification lens array plate facing a light source or a lens surface facing an image plane.

2. The erecting equal-magnification lens array plate according to claim 1, wherein the second shielding member totally prevents light from being transmitted by areas, on the lens surface facing the light source or the lens surface facing the image plane, in which a distance from the central line in the sub-scanning direction is equal to or greater than a predetermined distance.

3. The erecting equal-magnification lens array plate according to claim 1, wherein the second shielding member is formed by printing a light shielding pattern on the lens surface facing the light source or the lens surface facing the image plane with a shielding material.

4. The erecting equal-magnification lens array plate according to claim 2, wherein the second shielding member is formed by printing a light shielding pattern on the lens surface facing the light source or the lens surface facing the image plane with a shielding material.

\* \* \* \* \*